United States Patent
Sin et al.

(10) Patent No.: US 11,448,554 B2
(45) Date of Patent: Sep. 20, 2022

(54) METHOD AND DEVICE FOR ESTIMATING AMBIENT LIGHT

(71) Applicant: ams International AG, Jona (CH)

(72) Inventors: David Harlow Sin, Princeton, TX (US); George Richard Kelly, McKinney, TX (US); Pradeep Hegde, Frisco, TX (US); Ryan Owen, Eindhoven (NL)

(73) Assignee: ams International AG, Jona (CH)

( * ) Notice: Subject to any disclaimer, the term of this patent is extended or adjusted under 35 U.S.C. 154(b) by 0 days.

(21) Appl. No.: 17/416,040

(22) PCT Filed: Jan. 17, 2020

(86) PCT No.: PCT/EP2020/051195
§ 371 (c)(1),
(2) Date: Jun. 18, 2021

(87) PCT Pub. No.: WO2020/148451
PCT Pub. Date: Jul. 23, 2020

(65) Prior Publication Data
US 2022/0057267 A1    Feb. 24, 2022

Related U.S. Application Data

(60) Provisional application No. 62/794,128, filed on Jan. 18, 2019.

(51) Int. Cl.
*G01J 3/50* (2006.01)
*G09G 3/20* (2006.01)
*G09G 3/3208* (2016.01)

(52) U.S. Cl.
CPC ............ *G01J 3/506* (2013.01); *G09G 3/2003* (2013.01); *G09G 3/3208* (2013.01);
(Continued)

(58) Field of Classification Search
CPC ..... G01J 3/506; G09G 3/2003; G09G 3/2308; G09G 2320/0626; G09G 2360/141; G09G 2360/144
See application file for complete search history.

(56) References Cited

U.S. PATENT DOCUMENTS

| 2009/0040154 A1* | 2/2009 | Scheibe .................. G09G 3/14 345/83 |
| 2017/0092228 A1* | 3/2017 | Cote .................. G09G 3/3225 |
| 2019/0155501 A1 | 5/2019 | Zhang et al. |

OTHER PUBLICATIONS

International Search Report with Written Opinion for related Application No. PCT/EP2020/051195 dated Apr. 16, 2020 (11 Pages).

\* cited by examiner

*Primary Examiner* — kenneth bukowski
(74) *Attorney, Agent, or Firm* — Michael Best & Friedrich LLP

(57) ABSTRACT

A method for estimating ambient light at a display screen of a device. The method comprises determining one or more expected colour values of display screen output light, detecting light with a sensor positioned behind the display screen, determining one or more colour values of the detected light, determining a difference between the one or more expected colour values of the display screen output light and the one or more colour values of the detected light, and, from the determined difference, estimating a first portion of the detected light corresponding to the display screen output light and a second portion of the detected light corresponding to ambient light.

13 Claims, 5 Drawing Sheets

(52) U.S. Cl.
CPC .............. *G09G 2320/0626* (2013.01); *G09G 2360/141* (2013.01); *G09G 2360/144* (2013.01)

METHOD AND DEVICE FOR ESTIMATING AMBIENT LIGHT

BACKGROUND OF THE DISCLSOURE

The disclosure relates to a method and a device for estimating ambient light, particularly but not exclusively, to estimating ambient light at a display screen of a device with a sensor positioned behind the display screen.

In devices with display screens, ambient light typically has an effect on the visibility of content displayed on the display screen. In high ambient light conditions, for example where sunlight shines directly on the display screen, it may difficult for a user to view the content on the display screen. Conversely, in low ambient light conditions, for example at night, the display screen may appear too bright for a user. To mitigate the effect of high or low ambient light conditions, the brightness level of the display screen can be adjusted, for example increased or decreased. The brightness level may be adjusted manually by a user or automatically in response to one or more readings of an ambient light sensor of the device. An ambient light sensor may be positioned behind the display screen of a device. In this case, the signal picked up by the ambient light sensor is a sum of the ambient light coming from the surrounding environment (e.g. light incident on and passing through the display screen to hit the sensor) and the light generated by the display screen itself. Accordingly, the reading made by the ambient light sensor is not a true measurement of the ambient light but instead includes both ambient light and the light output by the display screen. To get a reliable measurement of ambient light, it is necessary to estimate the contribution of screen brightness and to subtract it from the total light measurement.

It is an aim of the present disclosure to provide a method and device for estimating ambient light that address one or more of the problems above or at least provides a useful alternative.

SUMMARY

In general, this disclosure proposes to overcome the above problems by finding an estimate of the display screen colour that is displayed on the display screen directly above the ambient light sensor and estimating the lux contribution of the display screen by using the display screen brightness setting and prior information of the lux contribution due to the estimated colour on the screen.

The prior information may be a clean measurement (i.e. in controlled conditions without any ambient light) of red, green and blue vectors of the display screen obtained, for example, during calibration. Thus, when an ambient light measurement is made with a sensor placed behind the display screen, the projection along the known, prior measured red, green and blue vectors of the measured light vector may be determined. The colour of the display screen directly above the ambient light sensor may then be estimated based on the projection coefficients of the measured light vector onto each of the red, green and blue vectors. Once the colour is estimated, the above prior information (e.g. stored in a memory of the device to which the screen belongs) and the display brightness setting may be used to estimate the lux contribution of the screen.

In other words, the disclosure proposes to overcome the above problems by determining the expected colour output of the display screen, determining how much a light measurement behind the display screen differs from the expected colour values of the output screen light, and using this difference to estimate how much of the measurement comes from the display screen light and how much from ambient light. In this way, the ambient light can be estimated.

The method of the present disclosure is superior to methods in which individual colours are not taken into account in the determination of the contribution of screen brightness to the ambient light measurement.

The term colour value as used herein may refer to, for example, relative intensities of different primary colours in a given colour space.

According to one aspect of the present disclosure, there is provided a method for estimating ambient light at a display screen of a device, the method comprising:

determining one or more expected colour values of display screen output light; detecting light with a sensor positioned behind the display screen; determining one or more colour values of the detected light; determining a difference between the one or more expected colour values of the display screen output light and the one or more colour values of the detected light; and from the determined difference, estimating a first portion of the detected light corresponding to the display screen output light and a second portion of the detected light corresponding to ambient light.

Accordingly, the present disclosure at least partially solves the above-described problems of estimating ambient light at a display screen.

The method may comprise determining an output colour gamut of the display screen for one or more output brightness levels, the colour gamut defining a set of expected colour values of light output by the display screen at respective brightness levels.

The determining the one or more expected colour values of the display screen output light may comprise using the output colour gamut for the corresponding output brightness level.

The set of expected colour values of the output colour gamut may comprise a subset of a colour space with red (R), green (G), blue (B) primary vectors, and the one or more expected colour values may comprise RGB values in the colour space.

The determining the one or more expected colour values of the display screen output light may comprise: determining one or more display screen output light RGB vectors in the colour space for the corresponding output brightness level.

The determining the one or more colour values of the detected light may comprise: estimating a detected light vector in the colour space by determining RGB values of the detected light.

The determining a difference between the one or more colour values of the detected light and the one or more expected colour values of the display screen output light may comprise: projecting the detected light vector onto the display screen output light RGB vectors in the colour space; and estimating respective differences between the projections and the display screen output light RGB vectors.

The estimating the second portion of the detected light may comprises: estimating an ambient light vector in the colour space, the ambient light vector having vector components comprising the respective differences between the projections and the display screen output light RGB vectors.

The colour space may be one of: an RGB colour space or an XYZ colour space.

The display screen may comprise an organic light-emitting diode (OLED) display screen.

The sensor may be positioned inside the device behind the display screen.

According to a second aspect of the present disclosure, there is provided a data-processing apparatus comprising means for carrying out the steps of any of the above described methods.

According to a third aspect of the present disclosure, there is provided a computer program comprising instructions which, when the program is executed by a computer, cause the computer to carry out the steps of any of the above described methods.

According to a fourth aspect of the present disclosure, there is provided a computer-readable storage medium having stored thereon the computer program described above.

According to a fifth aspect of the invention, there is provided a device comprising a display screen; a sensor positioned behind the display screen; a processor; and a computer-readable storage medium having stored thereon a computer program comprising instructions which, when the program is executed by the processor, cause the processor to carry out the steps of: determining one or more expected colour values of display screen output light; determining one or more colour values of light detected by the sensor; determining a difference between the one or more expected colour values of the display screen output light and the one or more colour values of the detected light; and from the determined difference, estimating a first portion of the detected light corresponding to the display screen output light and a second portion of the detected light corresponding to ambient light.

The sensor may be positioned inside the device behind the display screen.

BRIEF DESCRIPTION OF THE PREFERRED EMBODIMENTS

Some embodiments of the disclosure will now be described by way of example only and with reference to the accompanying drawings, in which.

DETAILED DESCRIPTION OF THE PREFERRED EMBODIMENTS

Generally speaking, the disclosure provides a method for estimating ambient light with a sensor positioned behind the display screen of a device by estimating the colour of the display screen directly above the sensor and using this knowledge to subtract the screen offset contribution to the ambient lux. The method allows the device to estimate and subtract the contribution of different screen colours better.

Some examples of the solution are given in the accompanying figures.

Figure 1:
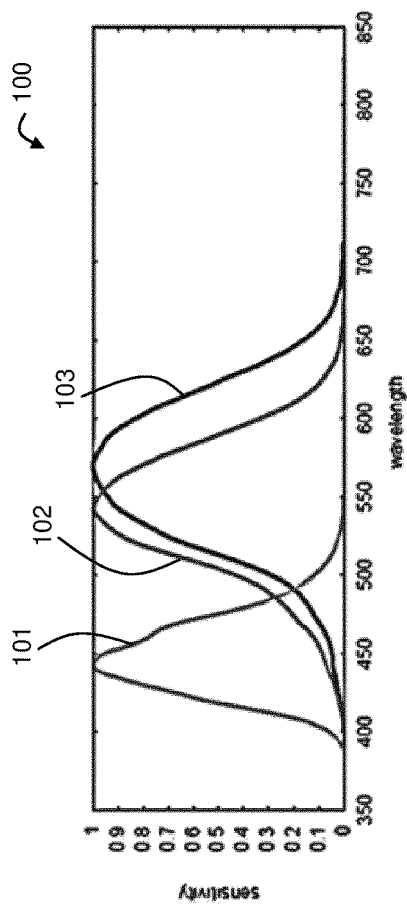
FIG. 1 shows a plot of sensitivity of the human eye to different wavelengths of light.

FIG. 1 shows a plot 100 of sensitivity of the human eye to different wavelengths of light. The human eye has three types of cone photoreceptor cells: long, medium and short which together determine the entirety of human colour perception. Each type of cell has different sensitivities to different wavelengths of light. Specifically, short cone photoreceptors 101 are most sensitive to bluer wavelengths and thus define the human eye's sensitivity to blue light, medium cone photoreceptors 102 to greener wavelengths, thus defining green sensitivity, and long cone 103 photoreceptors to redder wavelengths thus defining red sensitivity. For example, it is apparent from the sensitivity plot that humans are not as sensitive to 400 nm light (blue) compared to light at around 550 nm (green). Thus, light with a wavelength of around 400 nm will need to be significantly brighter than 550 nm light to give a human the impression that it has the same brightness or intensity. In other words, if a human sees green light and blue light that appear to be equally bright or intense, the blue light will be more luminous (i.e. has a higher radiance—an objective unit of light). Similar relationships between intensities of different wavelengths of light mean apply across the entirety of human colour perception. The skilled person will appreciate that human colour perception may be modelled using chromaticity models.

According to known chromaticity models, the manner in which humans perceive colour, that is the entire colour space of human perception, may be modelled by determining how much the long, medium, and short cone photoreceptor cells of the human eye need to be stimulated for a human eye to perceive a given colour. The short, medium and long cone receptor stimulation amounts are known as the tristimulus values. The tristumulus values may be used to establish how much red (R), green (G) and blue (B) light (i.e. primary colours) is needed to stimulate the corresponding photoreceptor cones in the human eye to evoke a given colour (that is a given wavelength) in the colour space of human perception. These RGB values may thus each be seen as components of a colour vector in human perception colour space, each colour vector having a corresponding wavelength associated with it.

Figure 2:
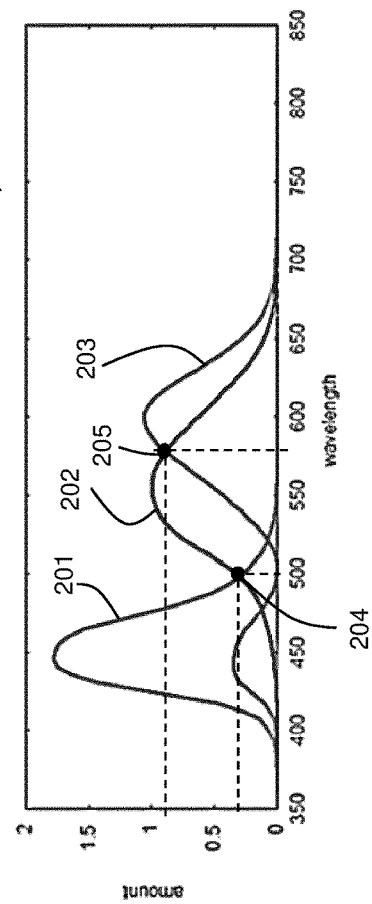
FIG. 2 shows a plot of relative red, green, blue intensities required to evoke the perception of light of a given wavelength in the human eye.

FIG. 2 shows a plot 200 derived from the plot of FIG. 1 showing the relative relationships of what a colour vector's components (blue 201, green 202, red 203) need to be to evoke a chosen wavelength of light. For example, to evoke a colour 204 corresponding to 500 nm wavelength light, the blue 201 and green 202 components are approximately the same 205 whereas the red 203 component is close to or at zero.

Similarly for the colour vector corresponding to a 575 nm wavelength, the red 203 and green 202 components are approximately the same 205, whereas the blue 201 component is close to or at zero. Each wavelength of light (i.e. each of the wavelengths of light along the wavelength axis in FIG. 2) is known as a spectral colour and has a corresponding colour vector whose components are the corresponding RGB values for that colour.

Figure 3:
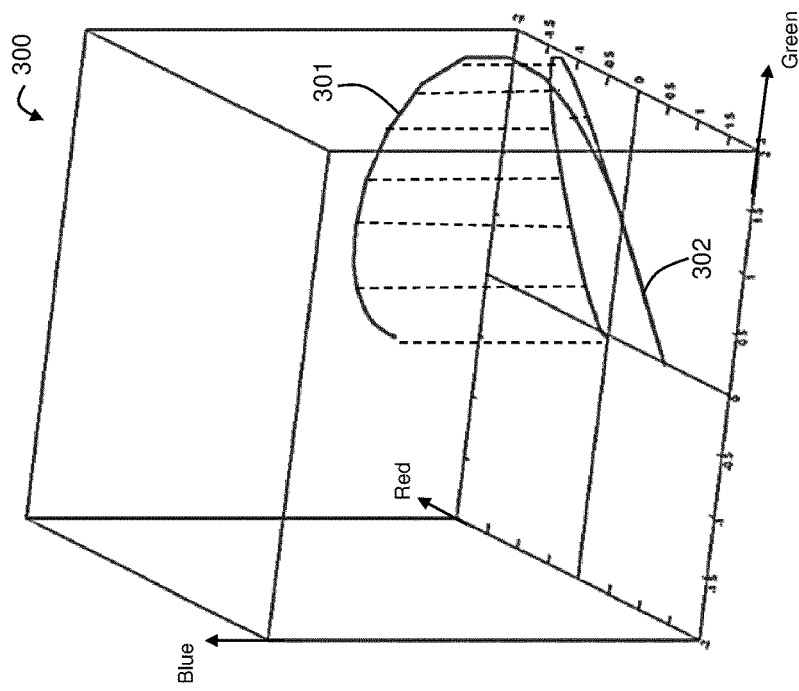
FIG. 3 shows a plot of a curve traced out by colour vectors of spectral colours in a colour space defined by RGB primary colour axes.

FIG. 3 shows a plot 300 of the curve 301 traced out by the colour vectors of the spectral colours in the colour space defined by RGB primary colour axes. The curve 301 may be projected into a 2D plane of the colour space, for example by taking out intensity information. In this example, the plane is the RG plane. The curve 302 in the 2D plane defines a chromaticity diagram. Every point on the curve 302 defines a chromaticity coordinate, also known as chromaticity, of a spectral colour. Every point inside the curve is a chromaticity of a non-spectral colour, that is colours that can only be created by mixing spectral colours. Every point outside the curve is an imaginary chromaticity that has no realisable colour. Whilst the example of FIG. 3 has been described in terms of RGB primary colour axes, it will be appreciated that the chromaticity diagram may also be defined in colour spaces with other axes, for example an XYZ colour space (e.g. the CIE XYZ colour space), and/or mapped between them, as will be appreciated by the skilled person. The space enclosed by the curve 302 is known as a colour gamut.

Figure 4:
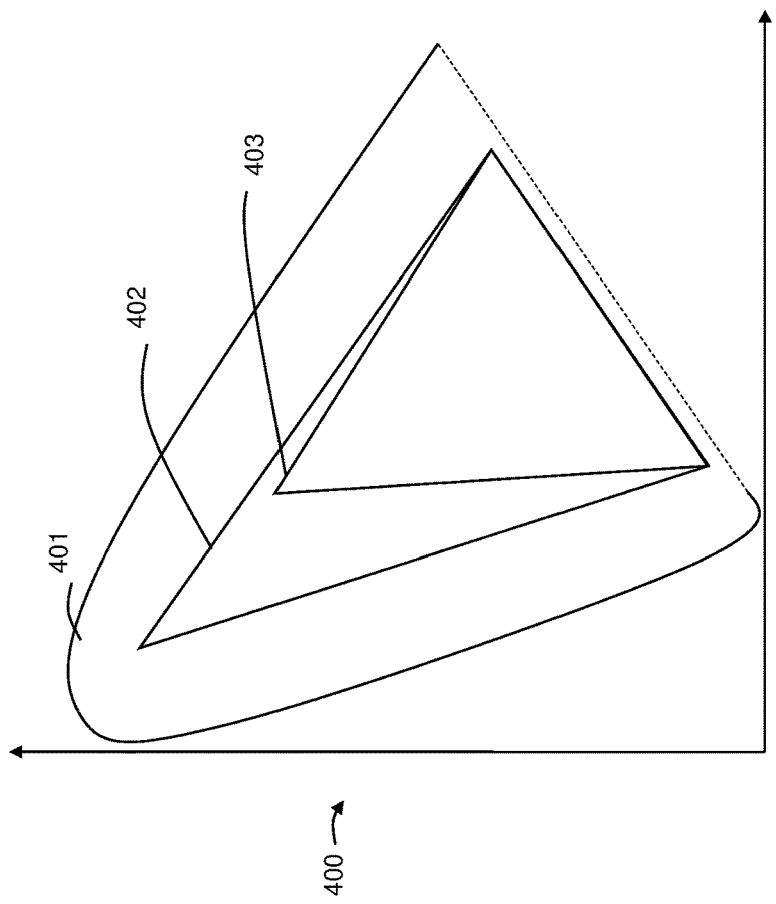
FIG. 4 shows a chromaticity diagram.

FIG. 4 shows a chromaticity diagram 400. The axes may be, for example, one or more of X-, Y- and Z-axes of an XYZ chromaticity space, or for example R-, G-, B-axes of an RGB chromaticity space. The present disclosure is not limited to any particular one chromaticity space, and it will be appreciated that known transformations may be used to map between different chromaticity spaces to each other, as will be appreciated by the skilled person.

Shown on the chromaticity diagram 400 of FIG. 4 is a first colour gamut 401 expressing a first colour space corresponding to the entirety of human colour perception from a light wavelength of around 380 nm to around 700 nm as has been described above with reference to FIGS. 1-3. FIG. 4 also shows a second colour gamut 402 expressing a second colour space corresponding to a subset of the first colour space, and a third colour gamut 403 expressing a third colour space corresponding to a third subset. An arbitrary number of other colour gamuts may also be present variously define subsets of the first colour space corresponding to the entirety of human colour perception. The second, third and other colour spaces may be, for example, known colours spaces such as sRGB, Adobe RGB, ProPhoto RGB, Colormatch RGB, SWOP CMYK, CIEXYZ, ICtCp, Real World, and/or others.

Typically, a display screen will not be able to output light of every colour in the colour space corresponding to the entirety of human colour perception. Instead, the colours that a given display screen can output will be determined by the technology the display screen uses and will be a subset corresponding to, for example, the subsets defined by the second, third or other colour gamuts described above with reference to FIG. 4. For example, the colour gamut expressing the colour space that organic light emitting diode (OLED) display technology can emit will be different to that of light emitting diode-backlit liquid crystal display (LED LCD) technology. If a display screen is instructed to emit light of a colour that is outside its colour gamut in a chromaticity diagram, it will typically snap to the closest colour inside its colour gamut that it can emit. In other words each display screen technology will have its own accessible colour gamut of colours it is able to emit.

Additionally, to model a complete accessible colour gamut for a given display screen, the accessible colour gamut may also need to be determined at different brightness settings. This is, in part, because increasing or decreasing screen brightness can have an impact on what light is ultimately output by the display screen for given input instructions. For example, turning down the brightness on a pixel that is emitting red light will result in a darker shade of red light. Thus, whilst the instructions to emit red have not changed, changing brightness nonetheless changes the colour. Conversely, increasing the brightness to close to maximum may cause the display screen to emit close to white light even though the input instructions are to emit red light. By estimating the colour gamut for the screen at multiple brightness levels, the expected colour of output light for given input instructions can be estimated at each of the brightness levels.

Figure 5:
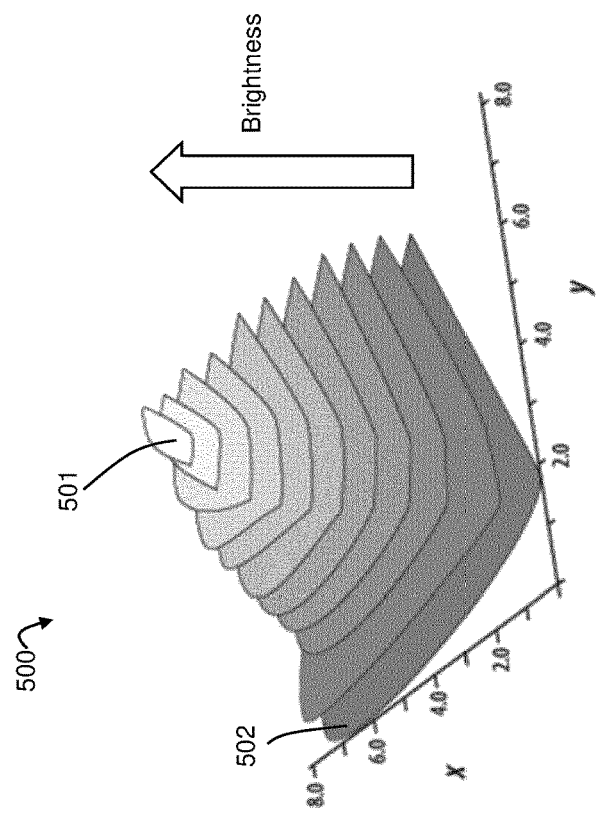
FIG. 5 shows a chromaticity diagram with different brightness levels.

FIG. 5 shows an illustrative plot 500 of output light colour gamuts for different brightness settings. In the example of FIG. 5, at the highest illustrated brightness setting, the accessible colours 501 are more limited than those 502 at the lowest illustrated brightness setting. The plurality of colour gamuts together provide the entire accessible colour space of colours that the display screen can output in response to instructions to emit a given colour.

As described above, determining the output light colour gamut of the display screen at one or more of the brightness settings may be performed during calibration of the display screen, for example during manufacture. This information may then be stored in a memory of the device to which the screen belongs. When it is desired to estimate the contribution the display screen makes to the measured lux at an ambient light sensor (that is, the contribution to the measured lux due to the estimated colour on the screen), the brightness setting of the screen and corresponding colour gamut(s) described above may be used to estimate the expected colour of the output light of the screen. If the measurement at the ambient light sensor differs from the expected colour, it may be inferred that ambient light is contributing the light picked up by the sensor. The difference between the expected colour and the measured colour provides an estimate of the ambient light at the display screen.

Figure 6:
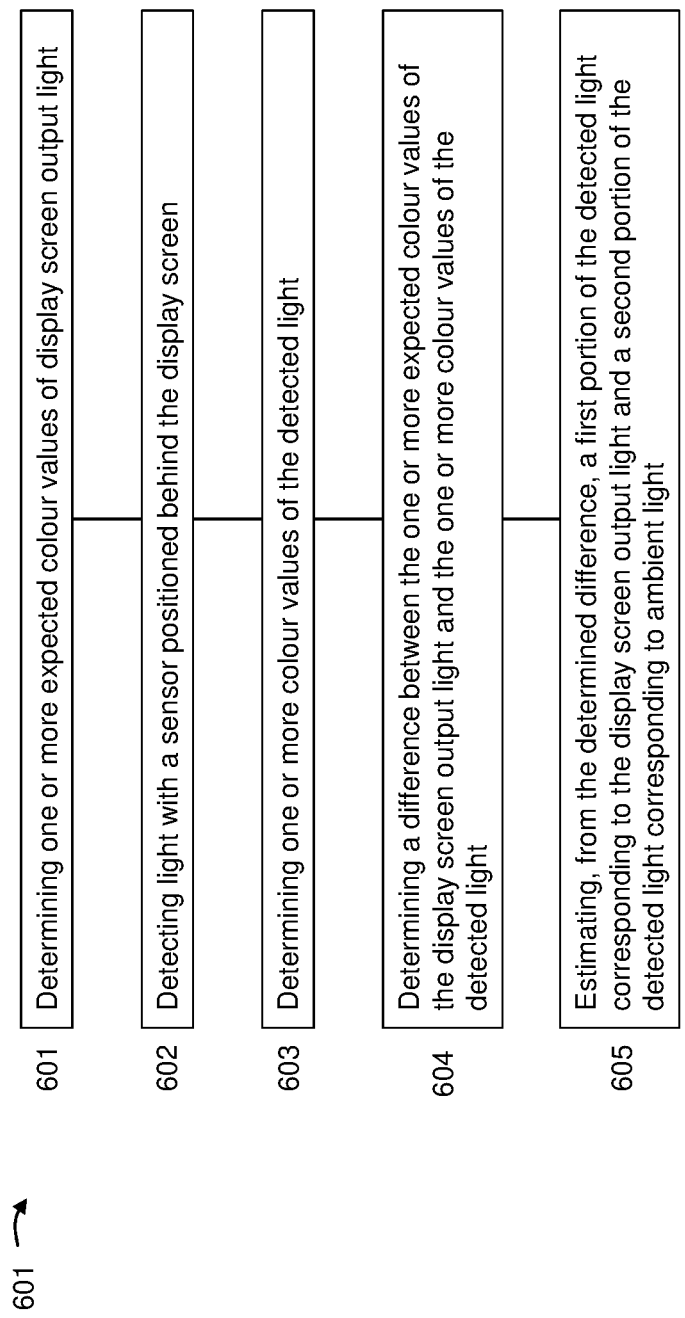
FIG. 6 shows a flowchart in accordance with the present disclosure.

FIG. 6 shows a flowchart illustrating method steps in accordance with the present disclosure. The method 600 is for estimating ambient light at a display screen of a device. One or more excepted colour values of a display screen's output light are determined 601, for example during calibration of the display screen during manufacture as described above. A sensor positioned behind the display screen detects 602 light incident on the screen. The detected light may include both an ambient light portion and a display screen light portion. One or more colour values of the detected light are determined 603 and a difference between the one or more expected colour values of the display screen output light and the one or more colour values of the detected light is determined 604. From the determined difference, respective first and second portions of the detected light are estimated 605. The first portion corresponds to the display screen light output and the second portion corresponds to the ambient light detected by the sensor. Estimating the ambient light in this way is advantageous over known techniques in that it allows the estimation of the contribution of different screen colours better. As described above, the term colour value may refer to, for example, relative intensities of different primary colours in a given colour space. For example, intensities of red, green, or blue light output by one or more pixels of the display screen.

Accordingly, with reference to FIGS. 1 and 2 and as described above, to ensure a user perceives different colours at the same intensity on a screen despite different sensitivities of the human eye, colours to which the human eye is less sensitive are typically brighter in screen output light. Conversely, colours to which the human eye is more sensitive may be less bright. Similarly, to try to match what a human would perceive ambient light levels to be, ambient light sensors often attempt to mimic the human eye by having a colour sensitivity profile similar to that shown in FIG. 1. Thus, even if a screen is set to a given brightness, certain colours may be output at a brighter than others (as determined at calibration) and this may skew the ambient light measurement to be brighter or dimmer depending on the colour of the screen even if the overall screen brightness setting is known.

In other words, the present disclosure takes into account that different colours may be brighter or dimmer at a given screen brightness setting and may be detected more or less sensitively and uses this to more accurately estimate how much of an ambient light sensor measurement is due to the screen output light and how much is actually ambient light.

According to the present disclosure, the method may further comprise determining an output colour gamut of the display screen for one or more output brightness levels. The determined colour gamut defines a set of expected colour values of light output by the display at the different brightness levels as has been described above in relation to FIGS. 1-5. For example, the colour gamut may express which colours the display screen is able to output (i.e. its accessible colours) according to the display screen technology used. The set of expected colour values of the output colour gamut together comprise a subset of a colour space. The colour space may be a colour space with red (R), green (G), and blue (B) primary vectors (i.e. a RGB colour space) and the one or more expected colour values may comprise RGB values in the RGB colour space. As has been described above, it is envisaged that the present disclosure may be used with any colour space, including for example XYZ colour space, and/or with multiple colour spaces. A suitable transform or mapping between different colour spaces may be used as will be appreciated by the skilled person.

The determining one or more expected colour values of the display screen output light may comprise determining one or more display screen output light RGB vectors in the colour space for the corresponding output brightness level. For example, a screen set at a given brightness may be instructed to display a colour having a chromaticity of R=50, G=50, B=25. Expressed in terms of the primary R, G, B colours of the colour space, these RGB values may be defined in vector form as: a red only vector (50, 0, 0); a blue only vector (0, 50, 0); and a green only vector (0, 0, 25). When added, these RGB vectors define the output colour vector of (50, 50, 25) in the colour space.

The determining one or more colour values of the detected light may comprise estimating a detected light vector, which may similarly comprise RGB vector components in the colour space. The detected light vector may thus be estimated by determining the R, G, B values of the detected light.

With the expected colour values of the display screen output light and the colour values of the detected light expressed in vector format in a common colour space, the difference between them may be determined. This may be done by, for example, projecting the detected light vector onto the display screen output light RGB vectors in the colour space and estimating respective differences between the projections and the display screen output light RGB vectors. Using the example given above, the display screen output light RGB vectors may be for example R(50, 0, 0), G(0, 50, 0) and B(0, 0, 25). For the sake of illustration, the ambient light sensor may have detected light having a detected light vector of (75, 75, 50) in the colour space. A first portion of the detected light vector is due to the display screen light in the vicinity of the sensor (e.g. directly above it) and a second portion is due to the actual ambient light. The projection coefficients of the detected light vector onto each of the display screen output light RGB vectors respectively are thus 1.5R+1.5G+2B and the R, B, and B vector components of the detected light vector are R(75, 0, 0), G(0, 75, 0), and B(0, 0, 50) respectively. The difference between the projections and the corresponding display screen output light RGB vectors may be determined, for example, by subtracting the display screen output light RGB vectors from the corresponding projections of the detected light vectors For example, R((75-50), 0, 0), G(0, (75-50), 0), and B(0, 0, (50-25)). The remaining RGB values after the subtraction has been performed correspond to the contribution of the ambient light: R(25, 0, 0), G(0, 25, 0), B(0, 0, 25). From this, it may be determined that the ambient light portion of the detected light corresponds to a vector of (25, 25, 25) in the colour space. In other words, the ambient light portion in this example is made up of equal parts red, green and blue light. In this example, the difference is determined by subtraction but other mathematical operations may also and/or additionally be used.

A comparative example is now provided where individual colour values are not used to determine the screen contribution. This example illustrates that not using individual colours may result in a less accurate measurement. Typically, an overall brightness setting technique assumes an identical intensity value for all expected colours in the colour space. For example, in the example above, an expected screen output vector of (50, 50, 25) for a given brightness setting is instead assumed to have identical expected values for all colours because they are not distinguished between. For example, it may have a relative brightness setting of 40 which, had the individual colour values been considered separately, would have corresponded to (40, 40, 40), rather than the more accurate (50, 50, 25) that expresses he relative intensities of the individual colours. Thus, when an ambient light measurement has a measurement vector of (75, 75, 50) and the expected contribution of the screen (40, 40, 40) is subtracted, the ambient light contribution which may take into account different colours individually is estimated to be (35, 35, 15) even though the ambient light in this example scenario, as explained above, is made up of equal parts red, green and blue light and so should have been estimated to be (25, 25, 25). Accordingly, an ambient light measurement which does not take into account individual expected colour values of the screen output light does not provide as accurate a measurement of ambient light.

Figure 7:
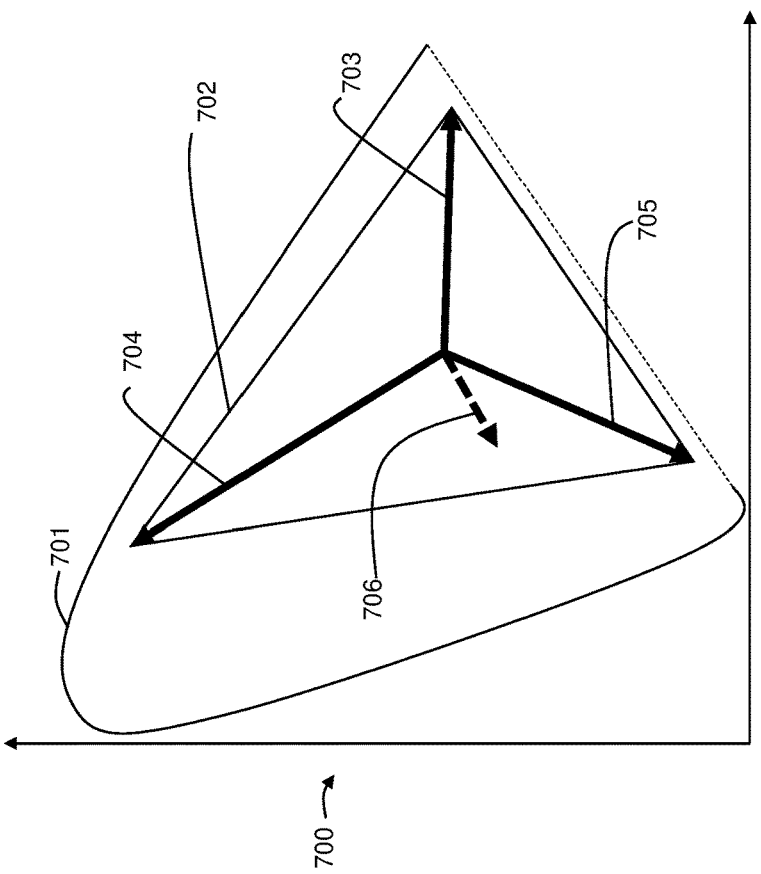
FIG. 7 shows a chromaticity diagram in accordance with the present disclosure.

FIG. 7 shows a chromaticity diagram 700 of the type described in accordance with the present disclosure, for example in FIGS. 1-5, and illustrates the steps of FIG. 6. As was the case in FIG. 4, the axes may be, for example, one or more of X-, Y- and Z-axes of an XYZ chromaticity space, or for example R-, G-, B-axes of an RGB chromaticity space. The present disclosure is not limited to any particular one chromaticity space, and it will be appreciated that known transformations may be used to map between different chromaticity spaces to each other, as will be appreciated by the skilled person. A first colour gamut 701 expressing a first colour space corresponding to the entirety of human colour perception and a second colour gamut 702 expressing a subset thereof corresponding to the accessible colours a given display screen can output are shown. Alternatively, if a sensor does not have a colour sensitivity profile exactly matching that of the human eye, the first colour gamut may instead be determined as described with reference to FIGS. 1-5 based on the sensitivity profile of the sensor rather than the human eye. The second colour gamut 702 may be estimated, for example during calibration by instructing the display screen to emit red-only light, green-only light, and blue-only light in turn and in controlled conditions without any ambient light. In each case, the output light may be measured by the ambient light sensor of the screen and the corresponding red 703, green 704 and blue 705 vectors determined. The curve between the endpoints of these primary colour vectors 703, 704, 705, defines the colour gamut 702 of accessible colours for the display screen.

Accordingly, after calibration and after a clean measurement of the red 703, green 704 and blue 705 vectors has been made and stored, for example in a memory of the device to which the display screen belongs, an ambient light measurement may be captured with a sensor placed behind the display screen (e.g. an OLED display screen). In the chromaticity diagram 700, the measurement will have a corresponding measurement vector 706, which is a sum of the screen brightness and any ambient light, whose projection along the three known red 703, green 704 and blue 705 vectors may be found, for example by using known mapping or transformation techniques. The projection coefficients of the measurement vector onto each of the red 703, green 704 and blue 705 vectors provides an estimate of the colour of the display screen directly above the ambient lights sensor. Once the colour is estimated, the prior knowledge (e.g. the colour gamut(s) established during calibration and stored on the memory of the device) and the display brightness setting may be used to estimate the lux contribution of the screen as has been described above with reference to FIG. 6. Each of the above steps may be implemented at least in part by a system including one or more processors e.g. microcontrollers and/or other data-processing apparatus.

Figure 8:
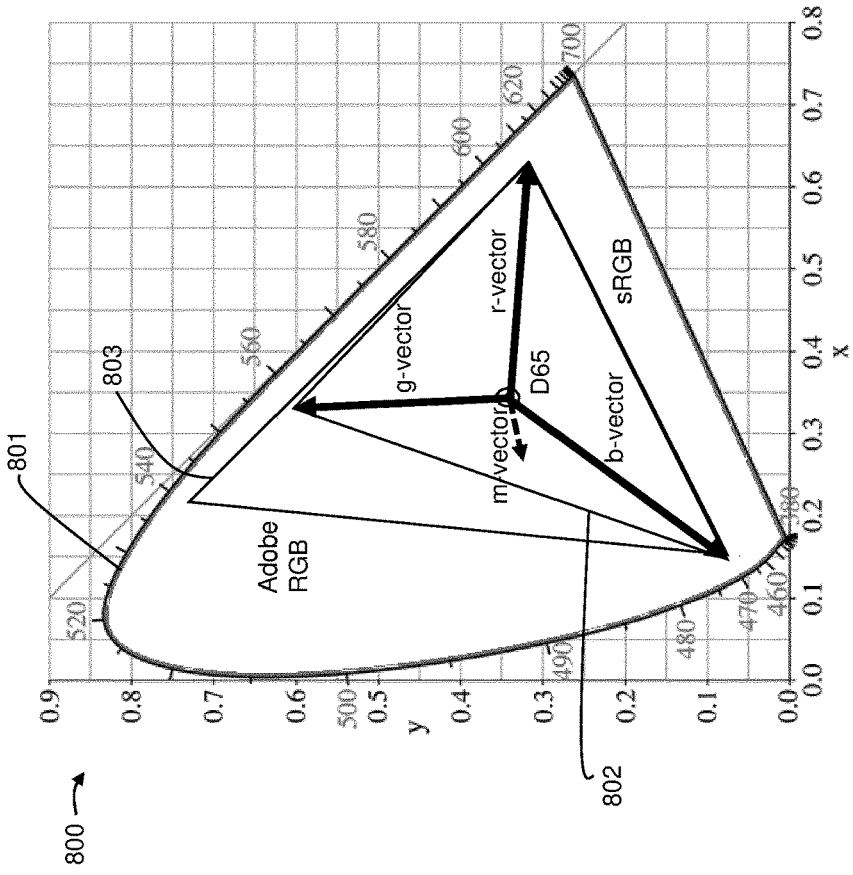
FIG. 8 shows a chromaticity diagram in accordance with the present disclosure.

FIG. 8 is a chromaticity diagram 800 of the type described in accordance with the present disclosure. The chromaticity diagram 800 is similar to that described with reference to FIG. 7 but FIG. 8 also illustrates some further details not shown in the chromaticity diagram of FIG. 7. The first colour gamut 801 in FIG. 8 shows demarcations indicating different wavelengths of light expressing the entirety of human colour perception (or that of the sensor if it does not match human eye colour sensitivity) as has been described above with reference to FIGS. 1-5. The axes indicate that the colour space shown in FIG. 8 corresponds to an XYZ colour space. The second colour gamut 802 corresponds to a sRGB colour gamut. Also shown on FIG. 8 is a third colour gamut 803 corresponding to an Adobe RGB colour gamut. Additionally, a point at the centre of the red, green, blue and measurement vector is provided corresponding to the standard D65 white point in the colour space, as will be appreciated by the skilled person.

Figure 9:
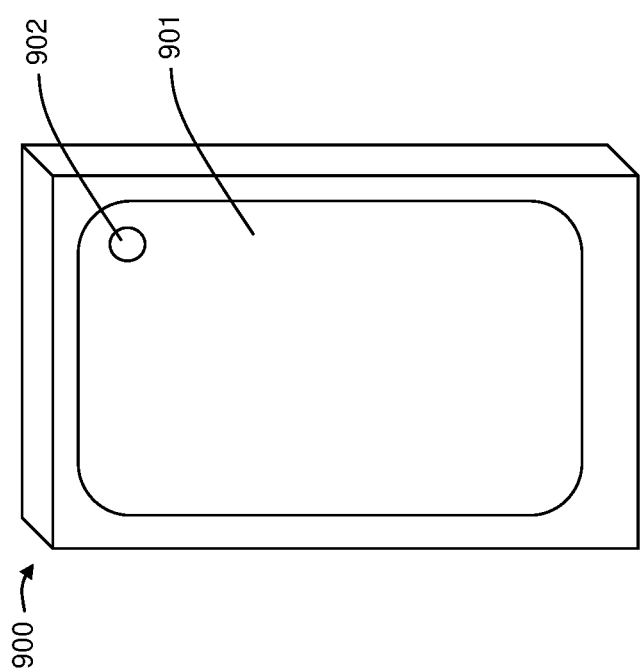
FIG. 9 shows a device in accordance with the present disclosure

FIG. 9 shows a device 900 in accordance with the present disclosure. The device comprises a display screen 901, a sensor 902 positioned behind the display screen (for example inside the device behind the display screen), a processor, and a computer-readable storage medium having stored thereon a computer program comprising instructions which, when the program is executed by the processor, cause the processor to carry out the steps in accordance with the present disclosure described with reference to FIGS. 1-8. For example, the instructions may cause the processor to determine one or more expected colour values of the display screen 901, determine one or more colour values of light detected by the sensor, determine a difference between the one or more expected colour values of the display screen output light and the one or more colour values of the detected light, and from the determined difference estimate a first portion of the detected light corresponding to the display screen output light and a second portion of the detected light corresponding to ambient light. The device 900 may be, for example, a smartphone, tablet, TV or other computer device having a display screen as will be appreciated by the skilled person.

Figure 10:
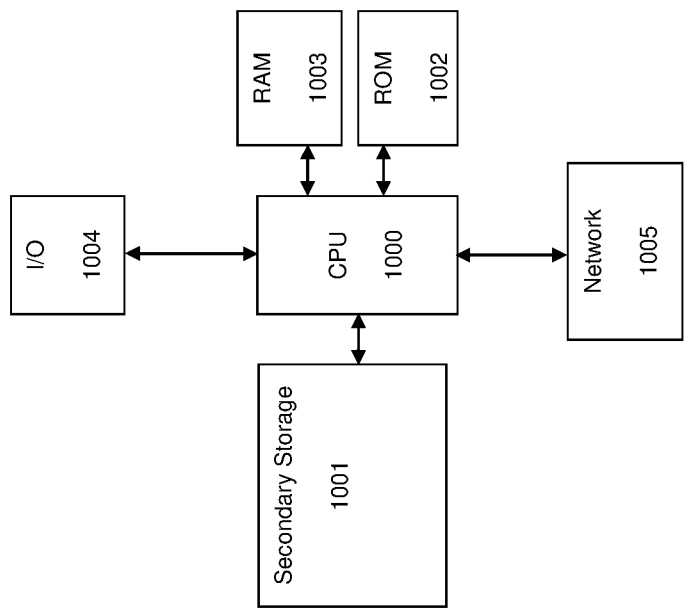
FIG. 10 shows a data-processing apparatus in accordance with the present disclosure.

FIG. 10 shows a data-processing apparatus in accordance with the present invention and that may be used as the processor and/or as part of the device described with reference to FIG. 9. The data-processing apparatus may comprise a processor 1000 that is in communication with memory devices including secondary storage 1001 (such as disk drives), read only memory (ROM) 1002, random access memory (RAM) 1003. The processor 1000 may be implemented as one or more CPU chips, which are cheaper than GPUs. The data-processing apparatus may further comprise input/output (I/O) devices 1004, and network connectivity devices 1005.

The secondary storage 1001 is typically comprised of one or more disk drives or tape drives and is used for non-volatile storage of data and as an over-flow data storage device if RAM 1003 is not large enough to hold all working data. Secondary storage 1001 may be used to store programs which are loaded into RAM 1003 when such programs are selected for execution.

In this embodiment, the secondary storage 1001 has an order processing component 1001a comprising non-transitory instructions operative by the processor 1000 to perform various operations of the method of the present disclosure. The ROM 1002 is used to store instructions and perhaps data which are read during program execution. The secondary storage 1001, the RAM 1003, and/or the ROM 1002 may be referred to in some contexts as computer readable storage media and/or non-transitory computer readable media.

I/O devices 1004 may include printers, video monitors, liquid crystal displays (LCDs), plasma displays, touch screen displays, keyboards, keypads, switches, dials, mice, track balls, voice recognizers, card readers, paper tape readers, or other well-known input devices.

The network connectivity devices 1005 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 1005 may enable the processor 1000 to communicate with the Internet or one or more intranets. With such a network connection, it is contemplated that the processor 1000 might receive information from the network, or might output information to the network in the course of performing the above-described method operations. Such information, which is often represented as a sequence of instructions to be executed using processor 1000, may be received from and outputted to the network, for example, in the form of a computer data signal embodied in a carrier wave.

The processor 1000 executes instructions, codes, computer programs, scripts which it accesses from hard disk, floppy disk, optical disk (these various disk based systems may all be considered secondary storage 1001), flash drive, ROM 1002, RAM 1003, or the network connectivity devices 1005. While only one processor 1000 is shown, multiple processors may be present. Thus, while instructions may be discussed as executed by a processor, the instructions may be executed simultaneously, serially, or otherwise executed by one or multiple processors.

Although the technical architecture is described with reference to a computer, it should be appreciated that the technical architecture may be formed by two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the technical architecture to provide the functionality of a number of servers that is not directly bound to the number of computers in the technical architecture. In an embodiment, the functionality disclosed above may be provided by executing the application and/or applications in a cloud computing environment. Cloud computing may comprise providing computing services via a network connection using dynamically scalable computing resources. A cloud computing environment may be established by an enterprise and/or may be hired on an as-needed basis from a third party provider.

It is understood that by programming and/or loading executable instructions onto the technical architecture, at least one of the CPU 1000, the RAM 1003, and the ROM 1002 are changed, transforming the technical architecture in part into a specific purpose machine or apparatus having the novel functionality taught by the present disclosure. It is fundamental to the electrical engineering and software engineering arts that functionality that can be implemented by loading executable software into a computer can be converted to a hardware implementation by well-known design rules.

Also provided herein is a computer program and a computer-readable storage medium for storing the computer program, comprising instructions which, when the program is executed by a computer, cause the computer to carry out the steps of the methods of any of the above embodiments.

Embodiments of the present disclosure can be employed in many different applications including ambient light measurement, for example, in mobile device, smart device, computing device, optical sensor systems, automotive systems, industrial lighting systems, consumer electronics and other industries in which display screens are used. Further, the method according to the present disclosure is particularly effective at estimating ambient light intensity when the display screen intensity is high relative to the ambient light intensity which is low. For example, when the ambient light intensity is less than 75% of the screen intensity, preferably less than 50%, and more preferably less than or at 30% of the screen intensity. At these relative intensity level ranges, especially at less than or at 30%, the screen contributes a significantly greater proportion of light to the sensor reading so the accuracy of the estimate of the contribution of the screen disproportionately impacts the accuracy of the ambient light estimate to a much greater degree than when both the ambient light and the screen intensity levels are high. Accordingly, the present invention provides a surprising advantage when the screen intensity is high and the ambient intensity is low.

LIST OF REFERENCE NUMERALS

100 plot of human eye sensitivities
101 short cone photoreceptor sensitivity
102 medium cone photoreceptor sensitivity
103 long cone photoreceptor sensitivity
200 plot of relative colour intensities
201 blue component
202 green component
203 red component
204 colour corresponding to 500 nm wavelength light
205 colour corresponding to 575 nm wavelength light
300 plot of curve traced out by colour vectors
301 3D curve
302 curve in 2D plane
400 chromaticity diagram
401 first colour gamut
402 second colour gamut
403 third colour gamut
500 plot of output light colour gamuts
501 accessible colours at high brightness
502 accessible colours at low brightness
600 method
601 determining one or more expected colour values
602 detecting light
603 determining or more colour values
604 determining a difference
605 estimating a first portion and a second portion of the detected light
700 chromaticity diagram
701 first colour gamut
702 second colour gamut
703 red vector
704 green vector
705 blue vector
706 measurement vector
800 chromaticity diagram
801 first colour gamut
802 second colour gamut
803 third colour gamut
900 device
901 display screen
902 sensor
1000 processor
1001 secondary storage
1002 read only memory
1003 random access memory
1004 input/output device(s)
1005 network connectivity devices The skilled person will understand that in the preceding description and appended claims, positional terms such as 'at', 'above', 'along', 'side', etc. are made with reference to conceptual illustrations, such as those shown in the appended drawings. These terms are used for ease of reference but are not intended to be of limiting nature. These terms are therefore to be understood as referring to an object when in an orientation as shown in the accompanying drawings. For example, the ambient light sensor has been described above to be positioned behind the display screen and it will thus be appreciated that the sensor may be positioned inside the device for example behind, underneath, covered by, enclosed by, the vicinity of and/or having other positional relationships with the display screen irrespective of the orientation of the sensor, screen and device. Further, in the term 'at' a display screen, the estimation of ambient light directly above the position of the sensor, in its vicinity, or depending on its field of view, a wider area of the display screen is envisaged. Accordingly, the terms 'at' the display screen and directly 'above' the sensor may encompass an area or volume as small as one pixel of the display screen to a larger one of the order of magnitude of many pixels up to the size of the entire display screen, depending on the positioning and field of view of the sensor.

Although the disclosure has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in any embodiments, whether alone or in any appropriate combination with any other feature disclosed or illustrated herein. For example, the sensor may be any known photodetector such as a photodiode and/or phototransistor or similar.

The invention claimed is:

1. A method for estimating ambient light at a display screen of a device, the method comprising:
    determining one or more expected colour values of display screen output light by determining one or more output light vectors in a colour space using an output colour gamut of the display screen for one or more output brightness levels, the colour gamut defining a set of said expected colour values of light output by the display screen at respective brightness levels;
    detecting light with a sensor positioned behind the display screen;
    determining one or more colour values of the detected light and estimating a detected light vector in said colour space from the one or more determined colour values;
    determining a difference between the one or more expected colour values of the display screen output light and the one or more colour values of the detected light by, in the colour space, performing a vector projection of the detected light vector onto the one or more output light vectors, and estimating respective differences between the vector projections and the one or more output light vectors; and
    from the determined difference, estimating a first portion of the detected light corresponding to the display screen output light and a second portion of the detected light corresponding to ambient light.

2. The method according to claim 1, wherein determining the one or more expected colour values of the display screen output light comprises using the output colour gamut for the corresponding output brightness level.

3. The method according to claim 2,
    wherein the set of expected colour values of the output colour gamut comprises a subset of a colour space with red (R), green (G), blue (B) primary vectors, and
    wherein the one or more expected colour values comprise RGB values in the colour space.

4. The method according to claim 3, wherein determining the one or more expected colour values of the display screen output light comprises:
    determining one or more display screen output light RGB vectors in the colour space for the corresponding output brightness level.

5. The method according to claim 3, wherein determining the one or more colour values of the detected light comprises:
    estimating a detected light vector in the colour space by determining RGB values of the detected light.

6. The method according to claim 5, wherein determining a difference between the one or more colour values of the detected light and the one or more expected colour values of the display screen output light comprises:
    projecting the detected light vector onto the display screen output light RGB vectors in the colour space by, in the colour space, performing a vector projection of the detected light vector onto the one or more output light RGB vectors; and
    estimating respective differences between the projections and the display screen output light RGB vectors.

7. The method according to claim 6, wherein estimating the second portion of the detected light comprises:
    estimating an ambient light vector in the colour space, the ambient light vector having vector components comprising the respective differences between the projections and the display screen output light RGB vectors.

8. The method according to claim 3, wherein the colour space is one of:
    an RGB colour space; and
    an XYZ colour space.

9. The method according to claim 1, wherein the display screen comprises an organic light-emitting diode (OLED) display screen.

10. The method according to claim 1, wherein the sensor is positioned inside the device behind the display screen.

11. A non-transitory computer-readable storage medium having stored thereon a computer program comprising instructions which, when the program is executed by a computer, cause the computer to carry out the steps of the method of claim 1.

12. A device comprising:
    a display screen;
    a sensor positioned behind the display screen;
    a processor; and
    a computer-readable storage medium having stored thereon a computer program comprising instructions which, when the program is executed by the processor, cause the processor to carry out the steps of:
        determining one or more expected colour values of display screen output light by determining one or more output light vectors in a colour space using an output colour gamut of the display screen for one or more output brightness levels, the colour gamut defining a set of said expected colour values of light output by the display screen at respective brightness levels;
        determining one or more colour values of light detected by the sensor and estimating a detected light vector in said colour space from the one or more determined colour values;
        determining a difference between the one or more expected colour values of the display screen output light and the one or more colour values of the detected light by, in the colour space, performing a vector projection of the detected light vector onto the one or more output light vectors, and estimating respective differences between the vector projections and the one or more output light vectors; and
        from the determined difference, estimating a first portion of the detected light corresponding to the display screen output light and a second portion of the detected light corresponding to ambient light.

13. The device according to claim 12, wherein the sensor is positioned inside the device behind the display screen.

* * * * *